US012619278B2

(12) United States Patent
Kishimoto et al.

(10) Patent No.: US 12,619,278 B2
(45) Date of Patent: May 5, 2026

(54) LOWER MODULE, DISPLAY DEVICE INCLUDING THE SAME AND METHOD FOR PROVIDING THE SAME

(71) Applicant: Samsung Display Co., Ltd., Yongin-si (KR)

(72) Inventors: Hirotsugu Kishimoto, Hwaseong-si (KR); Yongchan Jeon, Cheonan-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 360 days.

(21) Appl. No.: 18/181,667

(22) Filed: Mar. 10, 2023

(65) Prior Publication Data

US 2023/0297132 A1    Sep. 21, 2023

(30) Foreign Application Priority Data

Mar. 15, 2022    (KR) ........................ 10-2022-0032088

(51) Int. Cl.
| | |
|---|---|
| *G06F 1/16* | (2006.01) |
| *H04M 1/02* | (2006.01) |
| *H04M 1/18* | (2006.01) |

(52) U.S. Cl.
CPC .......... *G06F 1/1616* (2013.01); *G06F 1/1656* (2013.01); *H04M 1/0222* (2013.01); *H04M 1/185* (2013.01)

(58) Field of Classification Search
CPC .. G06F 1/1616; G06F 1/1656; H04M 1/0222; H04M 1/185
See application file for complete search history.

(56) References Cited

U.S. PATENT DOCUMENTS

| | | | |
|---|---|---|---|
| 10,074,824 B2 | 9/2018 | Han et al. | |
| 2013/0059118 A1* | 3/2013 | Yeh ........................ | H10D 86/60 |
| | | | 156/60 |
| 2018/0097197 A1* | 4/2018 | Han ..................... | G06F 1/1626 |
| 2018/0308903 A1* | 10/2018 | Jeong .................... | H10K 59/40 |

(Continued)

FOREIGN PATENT DOCUMENTS

| | | |
|---|---|---|
| KR | 1020180036904 A | 4/2018 |
| KR | 1020180062271 A | 6/2018 |

(Continued)

*Primary Examiner* — Maria V Ewald
*Assistant Examiner* — Ethan Weydemeyer
(74) *Attorney, Agent, or Firm* — CANTOR COLBURN LLP

(57) ABSTRACT

A display device includes a folding region, and a non-folding region which is adjacent to the folding region along a first direction, a display module which displays an image, a window on the display module, a lower support plate facing the window with the display module therebetween, the lower support plate including a metal material, and an upper support plate between the display module and the lower support plate. The upper support plate includes a support layer including glass fiber and a polymer material, a first surface including a first concave-convex pattern, and a second surface opposite to the first surface, closer to the display module than the first surface and including a second concave-convex pattern and a metal layer directly on the first surface of the support layer, in the non-folding region.

12 Claims, 10 Drawing Sheets

(56)                    References Cited

U.S. PATENT DOCUMENTS

2020/0163216  A1 *   5/2020  You ........................ H05K 1/189
2020/0196496  A1 *   6/2020  Shin .......................... G06F 1/16
2020/0260596  A1 *   8/2020  Park ..................... B32B 27/308
2021/0141418  A1     5/2021  Min

FOREIGN PATENT DOCUMENTS

KR        1020200052167  A      5/2020
KR        1020210055845  A      5/2021

* cited by examiner

LOWER MODULE, DISPLAY DEVICE INCLUDING THE SAME AND METHOD FOR PROVIDING THE SAME

This U.S. non-provisional patent application claims priority to Korean Patent Application No. 10-2022-0032088, filed on Mar. 15, 2022, and all the benefits accruing therefrom under 35 U.S.C. § 119, the entire contents of which are hereby incorporated by reference.

BACKGROUND

(1) Field

The present disclosure herein relates to a display device and a method for manufacturing (or providing) a lower module included therein. More particularly, to a display device including a folding region, and a method for manufacturing (or providing) a lower module included in the display device.

(2) Description of the Related Art

Various display devices used for multimedia devices such as a television, a mobile phone, a tablet computer, a navigation system, and a game machine are being developed. In order to facilitate portability and improve user convenience, display devices which are foldable or rollable, by being provided with bendable flexible display members, are being developed.

SUMMARY

Flexible display devices which are foldable or rollable, may include various display device members such as a window for protecting a display module or a support member for supporting the display module, without inhibiting a folding or bending operation of the display device. Accordingly, display device members with excellent folding properties, while maintaining mechanical properties, are desired.

The present disclosure provides a display device with excellent folding properties and improved durability.

The present disclosure also provides a method for manufacturing (or providing) a lower support module included in a display device with excellent folding properties and improved durability.

An embodiment of the invention provides a display device including a folding region, and a non-folding region divided into a first non-folding region and a second non-folding region spaced apart from each other in a first direction with the folding region interposed therebetween, a display module, a window disposed on an upper side of the display module, and a lower module disposed on a lower side of the display module. The lower module includes a lower support plate including a metal material, and an upper support plate disposed on the lower support plate, where the upper support plate includes a support layer including glass fiber and a polymer material, a first surface spaced apart from the display module and including a first concave-convex pattern, and a second surface facing the first surface and including a second concave-convex pattern, and a metal layer directly disposed on the first surface to correspond to the non-folding region.

In an embodiment, the support layer may include a folding portion corresponding to the folding region and defining a plurality of openings, a first support portion corresponding to the first non-folding region, and a second support portion corresponding to the second non-folding region.

In an embodiment, the first concave-convex pattern may be provided on a lower side of the folding portion, the first support portion, and the second support portion, and the second concave-convex pattern may be provided on an upper side of the folding portion, the first support portion, and the second support portion.

In an embodiment, each of the first concave-convex pattern and the second concave-convex pattern may include a concave portion and a convex portion.

In an embodiment, the metal layer may be directly disposed on a lower side of the support layer while filling the concave portion of the first concave-convex pattern.

In an embodiment, the metal layer may have a surface in contact with the first concave-convex pattern and having a surface roughness Rz of approximately 0.1 micrometer ($\mu$m) or greater.

In an embodiment, the polymer material may include at least one of epoxy, polyester, polyamide, polycarbonate, polypropylene, polybutylene and vinyl ester.

In an embodiment, a Young's Modulus of the support layer may be approximately 10 gigapascals (GPa) to approximately 40 GPa.

In an embodiment, a thickness of the support layer may be approximately 100 micrometers ($\mu$m) to approximately 300 $\mu$m.

In an embodiment the metal layer may include copper (Cu).

In an embodiment, the lower module may further include at least one of a protective layer, a buffer layer and a support module.

In an embodiment, the support layer may further include a plurality of prepreg layers including the glass fiber and the polymer material.

In an embodiment, the support layer may be 2 to 5 laminated prepreg layers.

In an embodiment of the invention, a method for manufacturing (or providing(a lower module includes providing a preliminary support layer including glass fiber and a polymer material, providing a metal layer with a concave-convex portion to each of a first surface and a second surface of the preliminary support layer which face each other, forming (or providing) a support layer with a concave-convex pattern by heating and pressurizing the preliminary support layer and the metal layer, and removing the metal layer from any one of the first surface and the second surface of the support layer.

In an embodiment, in the forming of the support layer, a pattern of the concave-convex portion provided on the metal layer by heating and pressurizing may be transitioned to the first surface and the second surface of the preliminary support layer.

In an embodiment, the removing of the metal layer may be performed by removing all of the metal layer from the second surface of the support layer, and removing some of the metal layer to be spaced apart in one direction on the first surface of the support layer and divided into a first metal layer and a second metal layer.

In an embodiment, the method for manufacturing a lower module of an embodiment may, after the removing of the metal layer, further include forming a plurality of openings on the support layer.

In an embodiment, in the method for manufacturing a lower module of an embodiment, the polymer material may include at least one of epoxy, polyester, polyamide, polycarbonate, polypropylene, polybutylene and vinyl ester.

In an embodiment, in the method for manufacturing a lower module of an embodiment, the preliminary support layer may be a plurality of laminated prepreg layers including glass fiber and a polymer material.

In an embodiment, in the method for manufacturing a lower module of an embodiment, the metal layer may have a surface provided with the concave-convex portion and having a surface roughness Rz of approximately 0.1 μm or greater.

In an embodiment, in the method for manufacturing a lower module of an embodiment, the metal layer may include copper (Cu).

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
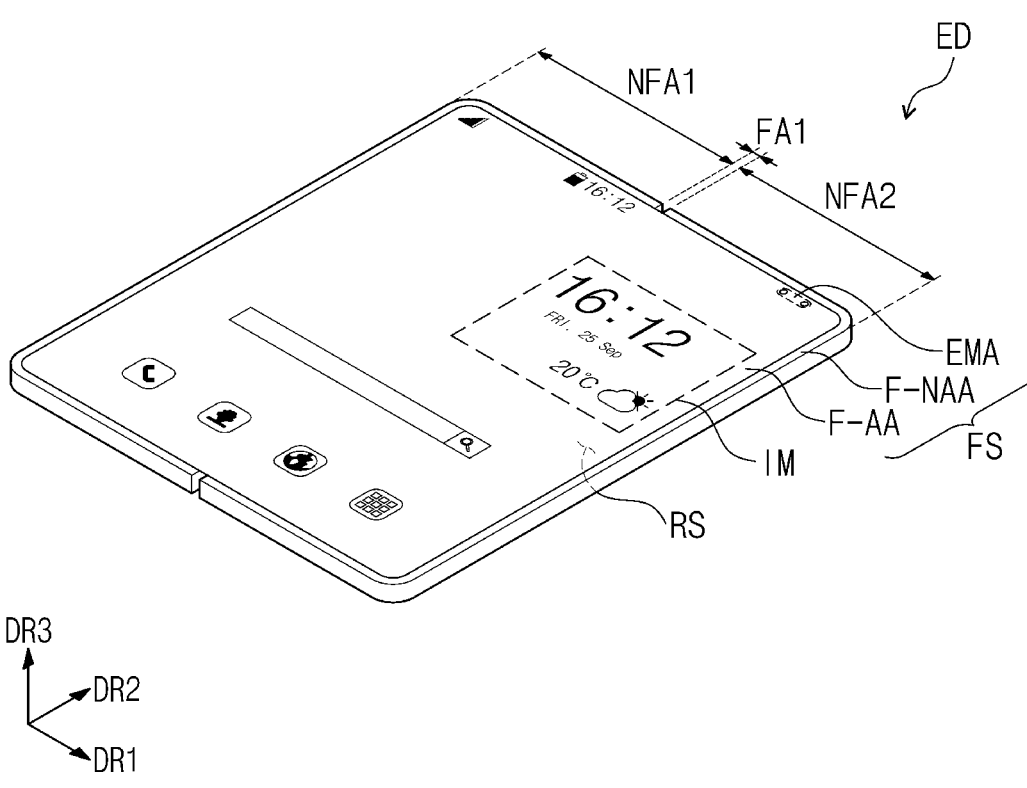
FIG. 1A is a perspective view showing a display device in an unfolded state according to an embodiment of the invention.

The invention may be modified in many alternate forms, and thus specific embodiments will be exemplified in the drawings and described in detail. It should be understood, however, that it is not intended to limit the invention to the particular forms disclosed, but rather, is intended to cover all modifications, equivalents, and alternatives falling within the spirit and scope of the invention.

In the present disclosure, when an element (or a region, a layer, a portion, and the like) is referred to as being related to another element such as being "on," "connected to," or "coupled to" another element, it means that the element may be directly disposed on/connected to/coupled to the other element, or that a third element may be disposed therebetween.

In the present disclosure, being "directly disposed" may mean that there is no layer, film, region, plate, or the like as a third element added between a portion of a layer, a film, a region, a plate, or the like and other portions. For example, being "directly disposed" may mean being disposed without additional members such as an adhesive member between two layers or two members.

Like reference numerals refer to like elements. As used herein, a reference number may indicate a singular element or a plurality of the element. For example, a reference number labeling a singular form of an element within the drawing figures may be used to reference a plurality of the singular element within the text of specification. Also, in the drawings, the thickness, the ratio, and the dimensions of elements are exaggerated for an effective description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings. In the present disclosure, being "disposed on" may not only include the case of being disposed in an upper portion of any one member but also the case of being disposed in a lower portion thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device ED according to an embodiment of the invention will be described with reference to the accompanying drawings.

Figure 1B:
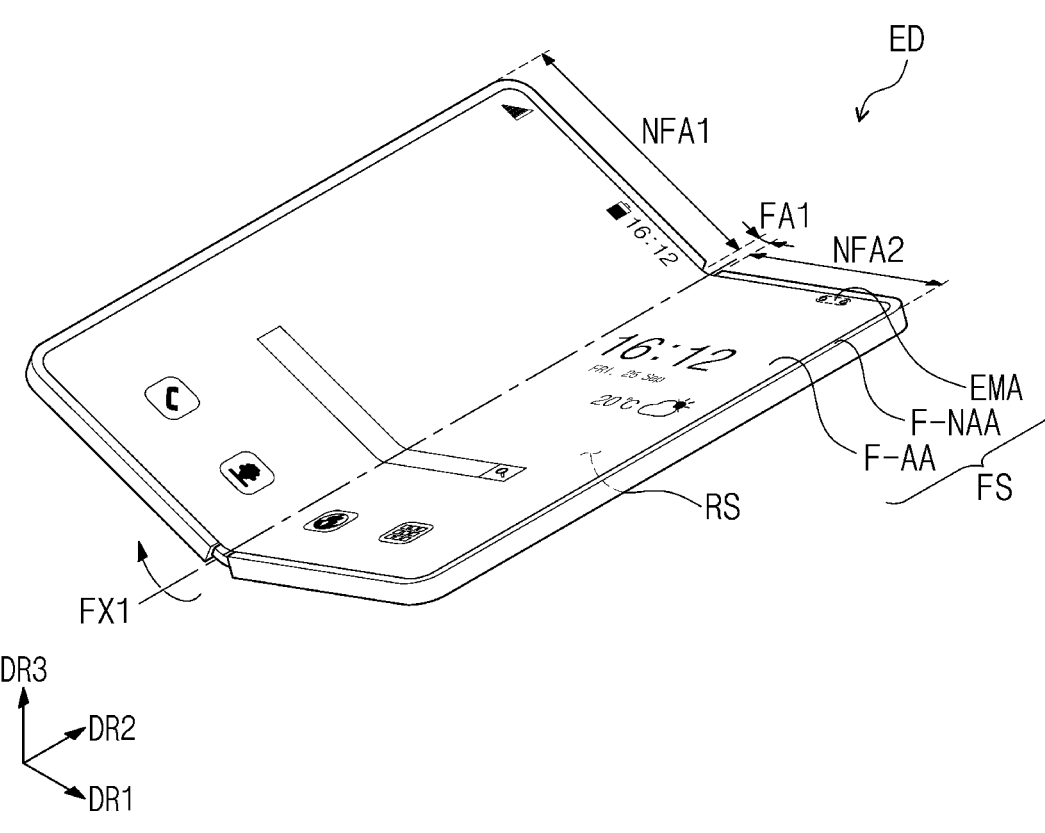
FIG. 1B is a perspective view showing an inner-folding process of a display device of an embodiment illustrated in FIG. 1A.
Figure 1C:
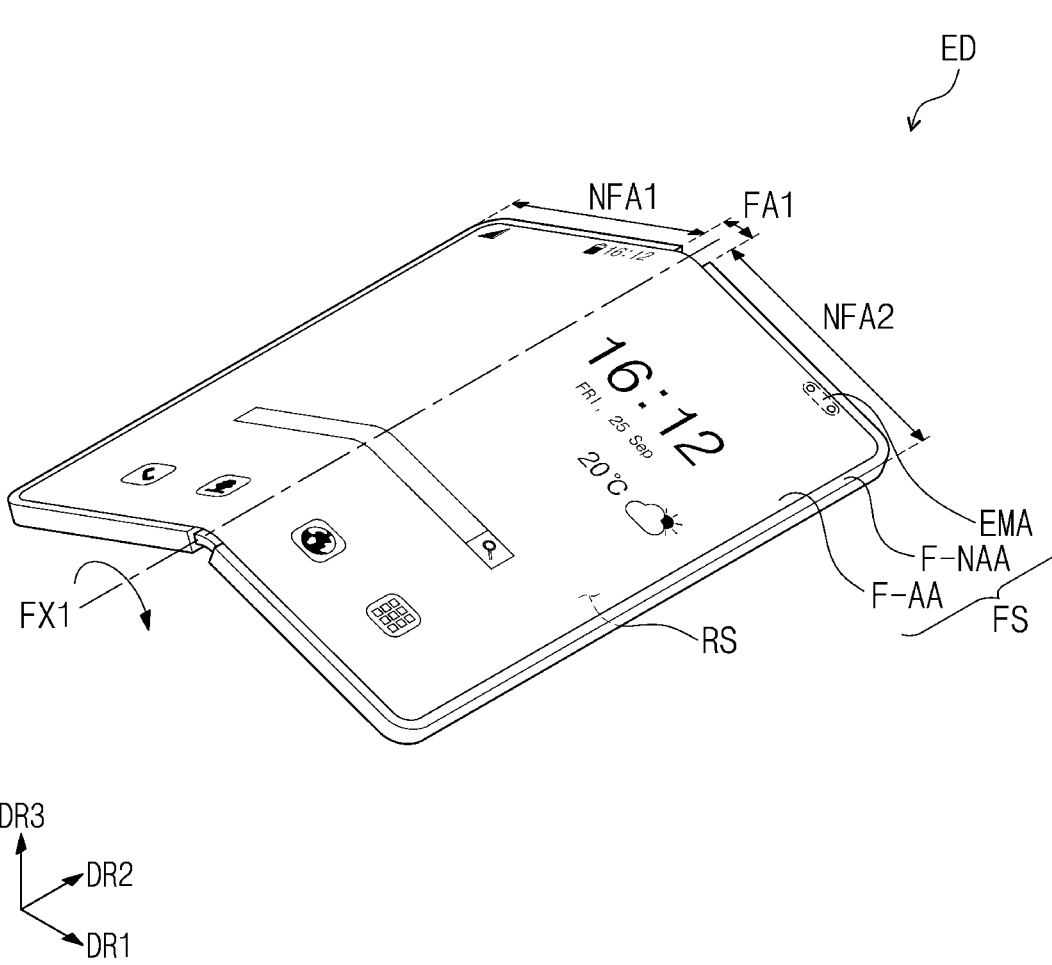
FIG. 1C is a perspective view showing an outer-folding process of a display device according to an embodiment illustrated in FIG. 1A.

FIG. 1A is a perspective view showing a display device ED which is unfolded or flat(e.g., in an unfolded state) according to an embodiment of the invention. FIG. 1B is a perspective view showing an inner-folding process (e.g., in-folding) of the display device ED illustrated in FIG. 1A. FIG. 1C is a perspective view showing an outer-folding process (e.g., out-folding) of the display device ED illustrated in FIG. 1A.

A display device ED of an embodiment may be a device activated according to an electrical signal, such as to constitute an electronic device. For example, the display device ED may be a mobile phone, a tablet computer, a car navigation system, a game console, or a wearable device, but the embodiment is not limited thereto. In FIG. 1A and the like of the present disclosure, the display device ED is exemplarily illustrated as a mobile phone.

Referring to FIG. 1A to FIG. 1C, the display device ED according to an embodiment may include a first display surface FS defined by a first direction axis DR1 and a second direction DR2 which crosses the first direction DR1. The display device ED may provide an image IM to outside the display device ED, such as to a user, through the first display surface FS. The display device ED of an embodiment may display the image IM toward the third direction DR3, on the first display surface FS disposed in a plane parallel to a plane defined by the first direction DR1 and the second direction DR2 crossing each other. In the present disclosure, a front surface (or an upper surface) and a rear surface (or a lower surface) of each component are defined on the basis of a direction in which the image IM is displayed. The front surface and the rear surface oppose each other in the third direction DR3, and the normal direction of each of the front surface and the rear surface may be parallel to the third direction DR3. A thickness of various components and/or layers of the display device ED may be defined along the third direction DR3 (e.g., a thickness direction).

The display device ED according to an embodiment may include the first display surface FS and a second display surface RS. The first display surface FS may include a first active region F-AA, and a first peripheral region F-NAA. The first active region F-AA may include an electronic module region EMA. The second display surface RS may be defined as a surface opposing at least a portion of the first display surface FS. That is, the second display surface RS may be defined as a portion of a rear surface of the display device ED.

The display device ED according to an embodiment may sense an external input applied from the outside (e.g., from outside the display device ED). The external input may include various forms of inputs provided from the outside of the display device ED. For example, the external input may include not only a contact by a part of a user's body, such as a hand, but also an external input applied in close proximity to the display device ED, or adjacent thereto at a predetermined distance (for example, hovering). Also, the external input may have various forms such as force, pressure, temperature, light, and the like.

In FIG. 1A and the following drawings, the first direction DR1 to the third direction DR3 are illustrated. Directions indicated by the first to third direction axes DR1, DR2, and DR3 described in the present disclosure are relative concepts, and may be converted to different directions. In addition, the directions indicated by the first to third direction axes DR1, DR2, and DR3 may be described as first to third directions, and may be denoted by the same reference numerals.

The first active region F-AA of the display device ED may be a region activated to display an image IM, according to an electrical signal. The display device ED according to an embodiment may display the image IM through the first active region F-AA. In addition, various forms of external inputs may be sensed in the first active region F-AA.

The first peripheral region F-NAA is adjacent to the first active region F-AA. The first peripheral region F-NAA may have a predetermined color. The first peripheral region F-NAA may surround the first active region F-AA, in a plan view (e.g., along the third direction DR3). Accordingly, the shape of the first active region F-AA in the plan view (e.g., a planar shape) may be substantially defined by the first peripheral region F-NAA. However, this is only exemplary. The first peripheral region F-NAA may be disposed adjacent to only one side of the first active region F-AA, or may be omitted. The display device ED according to an embodiment of the invention may include an active region in various shapes, and is not limited to any one embodiment.

The display device ED may include a folding region FA1 and a non-folding region provided in plural including a plurality of non-folding regions NFA1 and NFA2. In an embodiment, the non-folding regions NFA1 and NFA2 may be disposed adjacent to or extend from the folding region FA1, with the folding region FA1 interposed therebetween. The display device ED of an embodiment may include a first non-folding region NFA1 and a second non-folding region NFA2 disposed spaced apart from each other in a first direction DR1, with the folding region FA1 interposed therebetween. For example, the first non-folding region NFA1 may be disposed on one side of the folding region FA1 along the first direction DR1, and the second non-folding region NFA2 may be disposed on the other side of the folding region FA1 along the first direction DR1.

While FIG. 1A to FIG. 1C illustrate an embodiment of the display device ED including one folding region FA1, but the embodiment is not limited thereto, and the display device ED may have a plurality of folding regions. Various components or layers of the display device ED may include an active region, a peripheral region, a folding region, a non-folding region, etc. corresponding to those described above.

Referring to FIG. 1B, the display device ED according to an embodiment may be foldable about a folding axis, such as to be folded with respect to a first folding axis FX1. The first folding axis FX1 is a virtual axis extended in a second direction DR2 direction, and the first folding axis FX1 may be parallel to a direction of a long side of the display device ED. The first folding axis FX1 may be extended along the second direction DR2 on (or at) the first display surface FS.

The display device ED may be folded with respect to the first folding axis FX1 and transformed into an in-folded state in which, among portions of the first display surface FS, one region overlapping (or corresponding to) the first non-folding region NFA1 and the other region overlapping the second non-folding region NFA2 face each other.

In the in-folded state, the second display surface RS of the display device ED according to an embodiment may be exposed to outside the display device ED so as to be visually recognized from outside the display device ED, such as by a user. The second display surface RS may further include an electronic module region EMA in which an electronic module including various components is disposed, and is not limited to any one embodiment.

Referring to FIG. 1C, the display device ED according to an embodiment may be folded with respect to the first folding axis FX1 and transformed into an out-folded state in which, among portions of the second display surface RS, one region overlapping the first non-folding region NFA1 and the other region overlapping the second non-folding region NFA2 face each other. Here, the first display surface FS is exposed to outside the display device ED so as to be visually recognized from outside the display device ED, such as by a user.

However, the embodiment of the invention is not limited thereto, and the display device ED may be folded with respect to a plurality of folding axes such that a portion of each of the first display surface FS and the second display surface RS may be folded to face each other. Additionally, the number of folding axes and the number of non-folding regions in accordance therewith are not particularly limited.

The electronic module region EMA may have various electronic modules disposed therein or may correspond to various electronic modules which provide a function to the display device ED, such as by using light, an audio signal, heat, etc. For example, an electronic module may include at least one of a camera, a speaker, a light sensing sensor, or a heat sensing sensor. The electronic module region EMA may sense an external object or external input received through the first or second display surface FS or RS, or may provide a sound signal such as voice to the outside through the first or second display surface FS or RS. An electronic module may include a plurality of components, and is not limited to any one embodiment.

The electronic module region EMA may be surrounded by the first active region F-AA and the first peripheral region F-NAA. However, the embodiment of the invention is not limited thereto. The electronic module region EMA may be disposed inside the first active region F-AA, and is not limited to any one embodiment. The electronic module region EMA may not contribute to display of an image IM, but is not limited thereto.

Figure 2A:
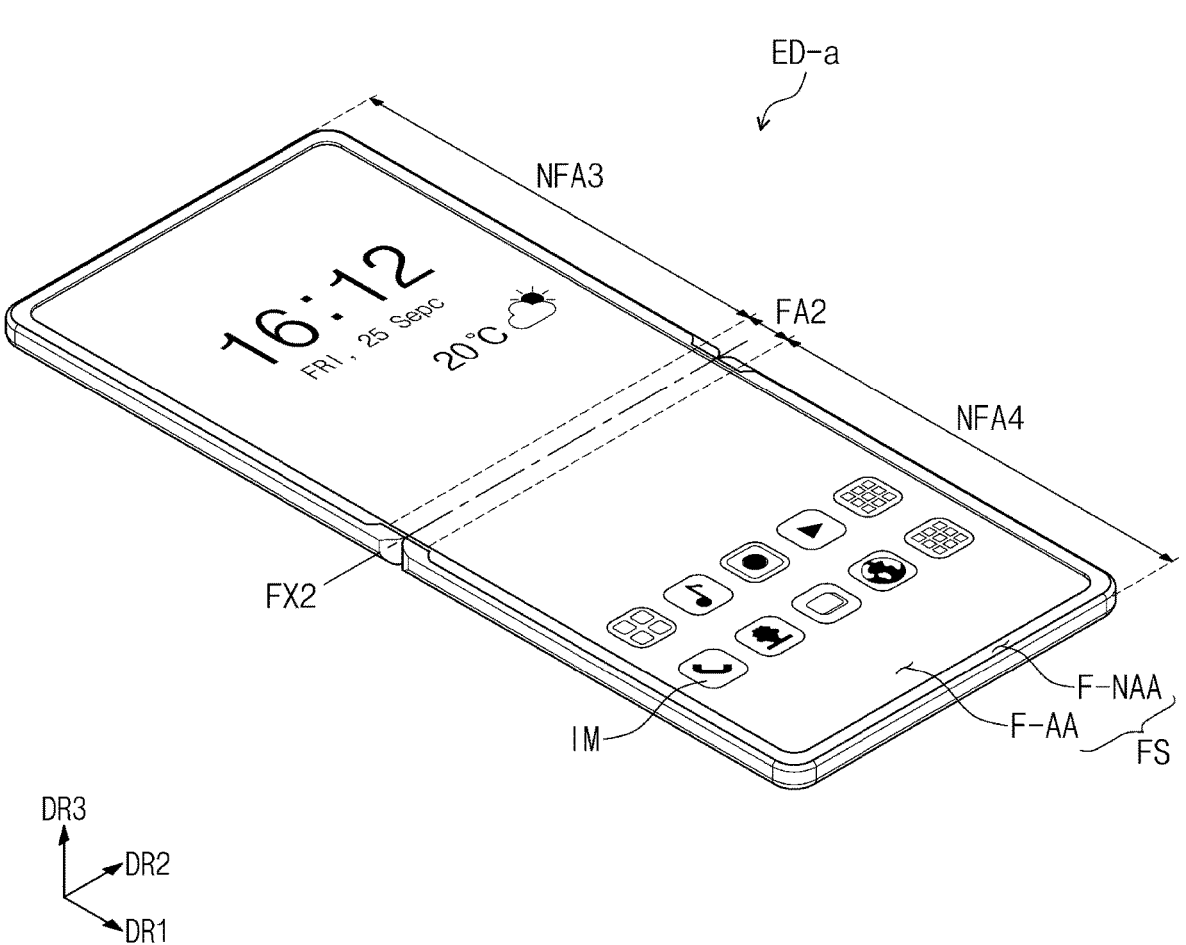
FIG. 2A is a perspective view showing a display device in an unfolded state according to an embodiment of the invention.
Figure 2B:
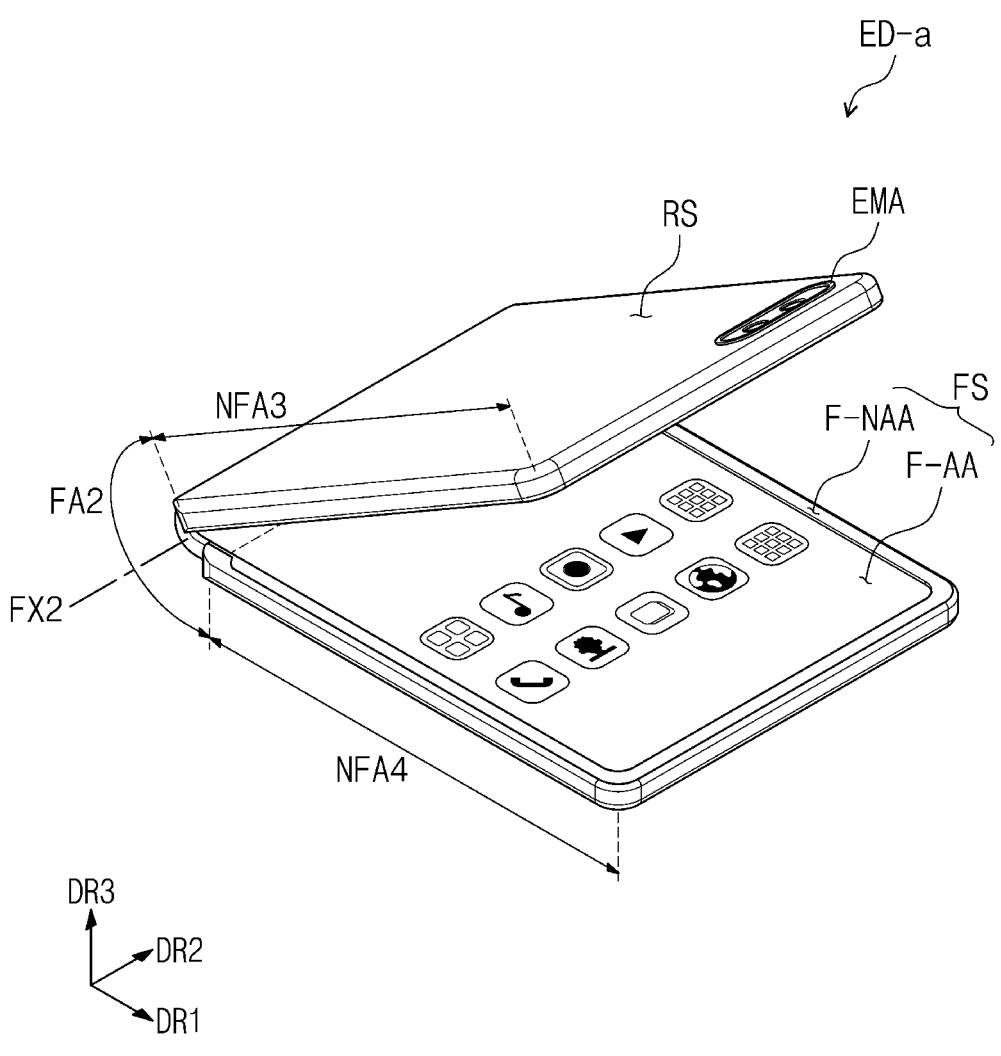
FIG. 2B is a perspective view showing an inner-folding process of a display device of an embodiment illustrated in FIG. 2A.

FIG. 2A is a perspective view showing a display device ED-a which is unfolded (e.g., in an unfolded state) according to an embodiment of the invention. FIG. 2B is a perspective view showing an inner-folding process of the display device ED-a illustrated in FIG. 2A.

A display device ED-a of an embodiment may be folded with respect to a second folding axis FX2 extended in one direction parallel to the second direction DR2. FIG. 2B illustrates a case in which an extension direction of the second folding axis FX2 is parallel to an extension direction of a short side of the display device ED-a. However, the embodiment of the invention is not limited thereto.

The display device ED-a according to an embodiment may include at least one folding region FA2 and a plurality of non-folding regions NFA3 and NFA4 which are adjacent to or extend from the folding region FA2. The non-folding regions NFA3 and NFA4 may be disposed spaced apart from each other with the folding region FA2 interposed therebetween.

The display device ED-a which is folded at the folding region FA2 may define a predetermined curvature and a predetermined radius of curvature at the folding region FA2. In an embodiment, a third non-folding region NFA3 and a forth second non-folding region NFA4 face each other, and the display device ED-a may be inner-folded such that the first display surface FS is not exposed to the outside.

In addition, unlike what is illustrated, the display device ED-a may be outer-folded such that the first display surface FS is exposed to the outside. In an embodiment, when the display device ED-a is not folded, the first display surface FS may be visually recognized by a user, and when in the inner-folded state, the second display surface RS may be visually recognized by a user. The second display surface RS may include an electronic module region EMA in which an electronic module including various components is disposed.

The display device ED-a according to an embodiment may include the second display surface RS, where the second display surface RS may be defined as a surface opposing at least a portion of the first display surface FS. In the inner-folded state, the second display surface RS may be visually recognized by a user. The second display surface RS may include an electronic module region EMA in which an electronic module including various components is disposed. In an embodiment, an image IM may be provided through the second display surface RS.

In an embodiment, the display devices ED and ED-a may be configured such that an inner-folding or outer-folding operation may be alternatively repeated from an un-folding operation, but the embodiment of the invention is not limited thereto. In an embodiment, the display devices ED and ED-a may be configured to select only one of the un-folding operation, the inner-folding operation, and the outer-folding operation.

Figure 3:
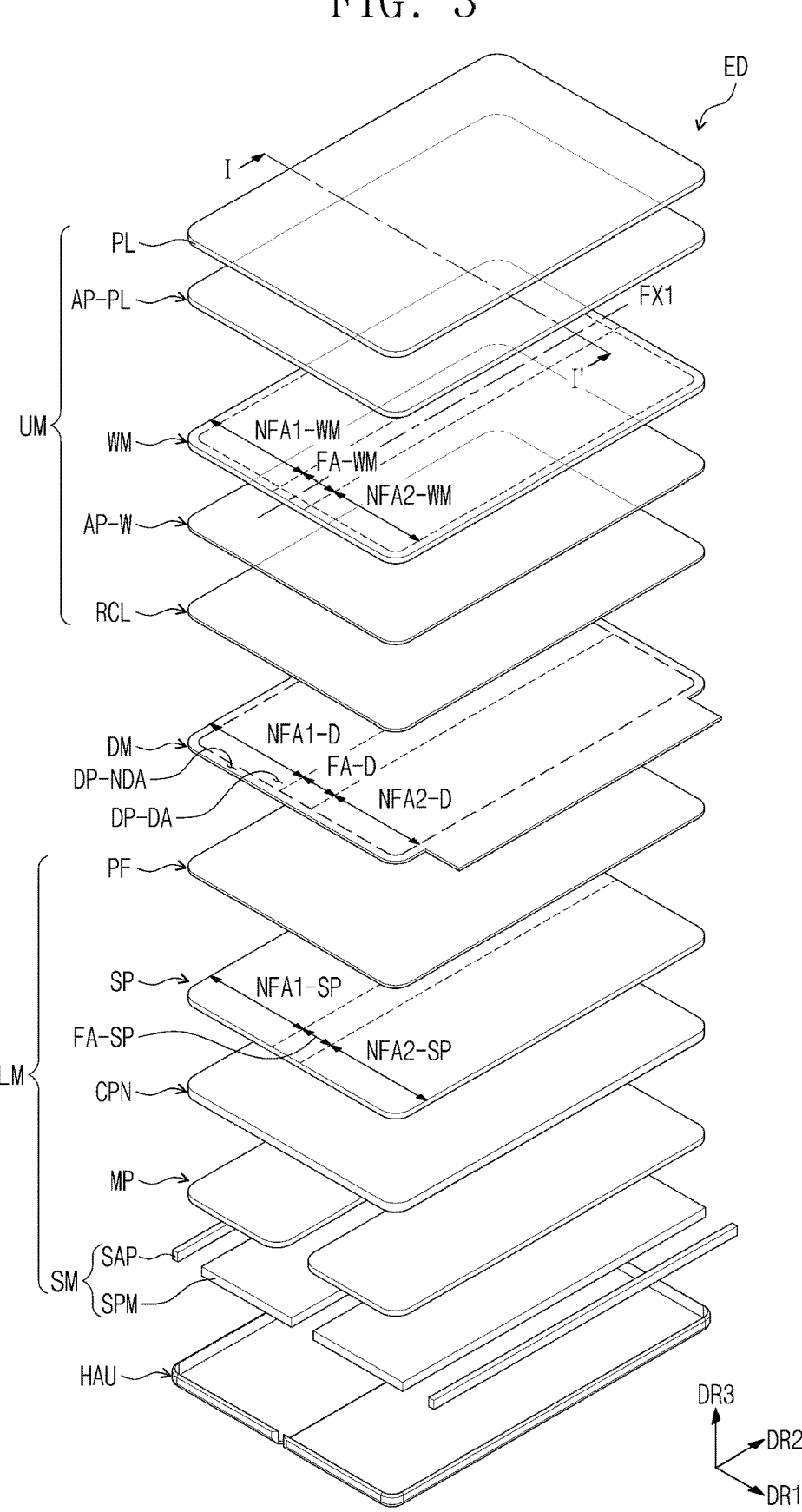
FIG. 3 is an exploded perspective view of a display device according to an embodiment of the invention.
Figure 4:
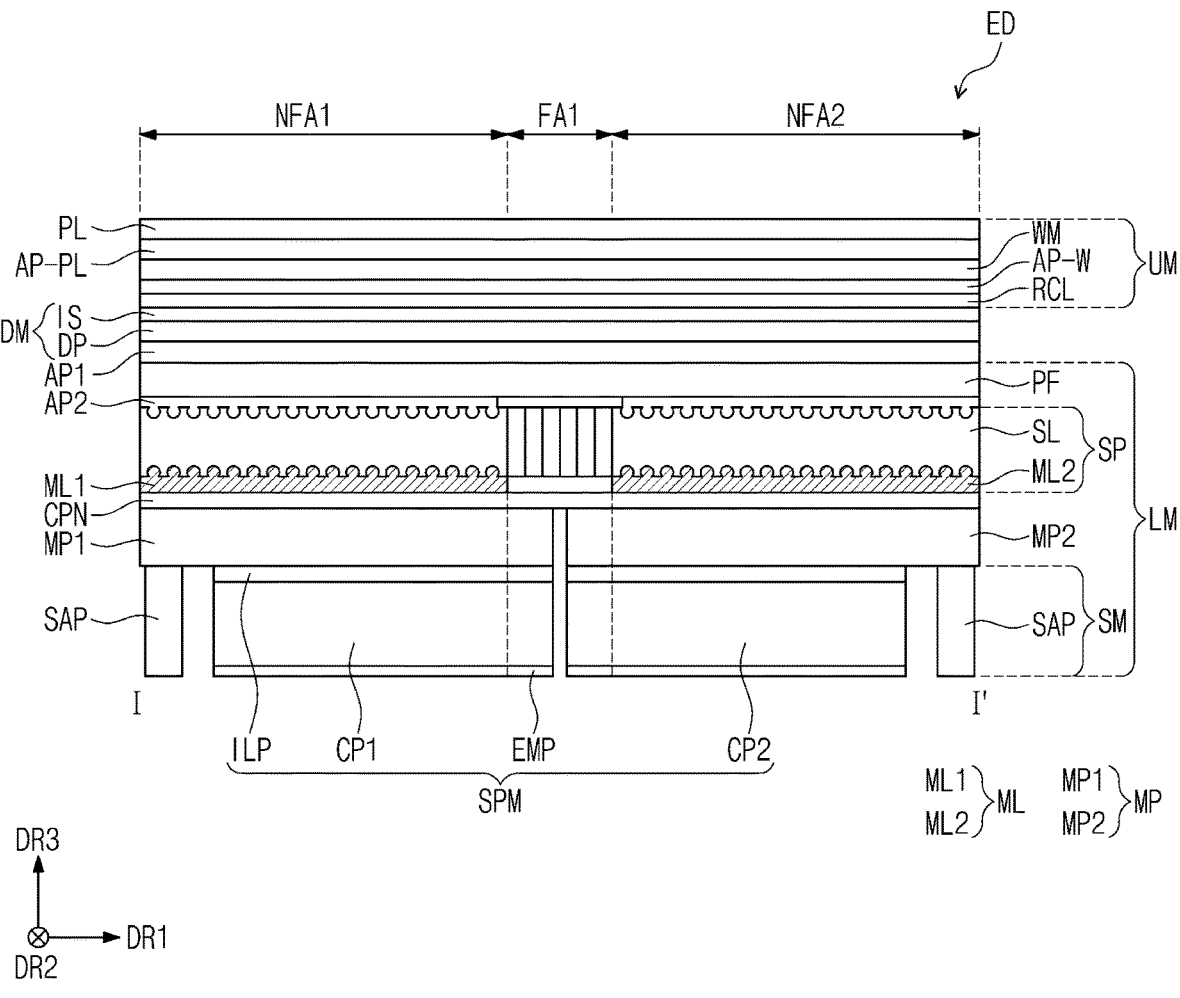
FIG. 4 is a cross-sectional view of a display device according to an embodiment of the invention.

FIG. 3 is an exploded perspective view of a display device ED according to an embodiment of the invention, and FIG. 4 is a cross-sectional view of a display device ED according to an embodiment of the invention. FIG. 3 is an exemplary exploded perspective view of the display device ED according to an embodiment illustrated in FIG. 1A. FIG. 4 is a cross-sectional view showing a portion corresponding to line I-I' of FIG. 3.

Referring FIG. 3 and FIG. 4, the display device ED of an embodiment may include a display module DM, an upper module UM disposed on an upper side of the display module DM, and a lower module LM disposed on a lower side of the display module DM. The upper module UM may include a window WM disposed on an upper side of the display module DM. In addition, the lower module LM may include an upper support plate SP and a lower support plate MP which are disposed on a lower side of the display module DM. In the present disclosure, the upper module UM may be referred to as a protective member, and the lower module LM may be referred to as a support member.

The upper module UM is disposed on the upper side of the display module DM, and may serve as a protective layer which protects the display module DM from an external impact and the like, as an optical layer which prevents reflection by external light or increases a light extraction efficiency, or the like.

The display device ED of an embodiment includes the display module DM, the window WM disposed on the upper side of the display module DM, and the upper support plate SP and the lower support plate MP which are disposed on the lower side of the display module DM. The upper support plate SP may include a metal layer ML and a support layer SL sequentially along the third direction DR3. In an embodiment, the support layer SL may be a composite film layer.

In an embodiment, the third direction DR3 in which the metal layer ML and the support layer SL are laminated may be a normal direction with respect to a plane defined by the first direction DR1, which is a direction perpendicular to the first folding axis FX1, and the second direction DR2, which is an extension direction of the first folding axis FX1. The display device ED which includes the upper support plate SP having the metal layer ML and the support layer SL laminated in the third direction DR3 may exhibit excellent folding properties and good mechanical properties. The upper support plate SP according to an embodiment including the metal layer ML and the support layer SL will be described in more detail later.

Referring FIG. 3 and FIG. 4, in an embodiment, the upper module UM may include the window WM, a protective film PL disposed on an upper side of the window WM, and an optical layer RCL disposed on a lower side of the window WM. In an embodiment, the protective film PL or the optical layer RCL in the upper module UM may be omitted.

The window WM may include a window folding portion FA-WM and a window non-folding portion provided in plural including a plurality of window non-folding portions NFA1-WM and NFA2-WM. In the present disclosure, the window folding portion FA-WM may be referred to as a folding portion, and the window non-folding portions NFA1-WM and NFA2-WM may be referred to as non-folding portion. A first non-folding portion NFA1-WM and a second non-folding portion NFA2-WM of the window WM may be spaced apart from each other with the folding portion FA-WM interposed therebetween. The folding portion FA-WM may be a portion corresponding to the folding region FA1 (see FIG. 1A), and the non-folding portions NFA1-WM and NFA2-WM may be portions corresponding to the non-folding regions NFA1 and NFA2 (see FIG. 1A).

In the display device ED of an embodiment, the window WM may entirely cover the outer side of the display module DM (e.g., may cover or corresponding to an entirety of a planar area of the display module DM. The window WM may have a shape corresponding to the shape of the display module DM.

In addition, the display device ED of an embodiment may include a housing HAU which accommodates the display module DM, the lower module LM, and the like. The housing HAU may be coupled to the window WM. Although not illustrated, the housing HAU may further include a hinge structure for facilitating folding or bending of the housing HAU and various components or layers accommodated within the housing HAU. In an embodiment, various components or layers of the display device ED may be foldable, bendable, rollable, etc. together with each other.

In an embodiment, the protective film PL may be disposed on an upper side of the window WM and protect the window WM from an external environment. A protective film adhesive layer AP-PL may be further disposed between the window WM and the protective film PL, and may attach the window WM to the protective film PL. The protective film adhesive layer AP-PL may be a pressure sensitive adhesive (PSA) layer, or an optically clear adhesive layer. Adhesive layers to be described below may also include the same adhesive as that of the protective film adhesive layer AP-PL. When the display device ED of an embodiment includes the protective film PL, the protective film PL may be a layer exposed to the outside from the display device ED. The protective film PL may define the uppermost layer of the display device ED, and may provide an outer surface of the display device ED.

The protective film PL may have optical properties of a transmittance of about 90% or greater and a haze value of less than about 1% in a visible light region. The protective film PL may include a polymer film such as a cyclo-olefin polymer (COP) film, a polyether sulfone (PES) film, a polyethylene terephthalate (PET) film, or the like. In addition, the protective film PL may have a polymer film as a base layer. The protective film PL may further include, on the base layer, a functional layer such as a hard coating layer, an anti-fingerprint coating layer, an anti-static coating layer, and the like. The protective film PL used in the display device ED of an embodiment may have flexibility, such as to be foldable, bendable, rollable, etc. together with other components or layers of the display device ED.

In an embodiment, the optical layer RCL may be disposed on the display module DM. The optical layer RCL may perform a function of reducing reflection by an external light. For example, the optical layer RCL may include an anti-reflection layer, a polarizing layer, or a color filter layer. In an embodiment, the optical layer RCL may be directly disposed on the display module DM. As being 'directly disposed' or in contact, elements may form an interface therebetween, without being limited thereto. However, the embodiment of the invention is not limited thereto. A separate adhesive member such as a pressure sensitive adhesive or an optically clear adhesive may be further disposed between the display module DM and the optical layer RCL.

Although not illustrated, the display device ED of an embodiment may further include a damping layer in the upper module UM. The damping layer may be disposed between the display module DM and the window WM.

The display device ED of an embodiment may include a window adhesive layer AP-W disposed between the optical layer RCL and the window WM. When the optical layer RCL is omitted in the display device ED of an embodiment, the window adhesive layer AP-W may be disposed between the display module DM and the window WM. The window adhesive layer AP-W may be a pressure sensitive adhesive (PSA) layer, an optically clear adhesive (OCA) film, or an optically clear adhesive resin (OCR) layer. In an embodiment, the window adhesive layer AP-W may be omitted.

In the display device ED an embodiment, the display module DM may display an image IM according to an electrical signal, and may transmit/receive information with respect to an external input. The display module DM may be defined as a display region DP-DA and a non-display region DP-NDA. The display region DP-DA may be defined as a region which emits an image IM provided from the display module DM.

The non-display region DP-NDA is adjacent to the display region DP-DA. For example, the non-display region DP-NDA may surround the display region DP-DA. However, this is only exemplary. The non-display region DP-NDA may be defined in various plan shapes, and is not limited to any one embodiment. According to an embodiment, the display region DP-DA of the display module DM may correspond to at least a portion of the first active region F-AA (see FIG. 1A).

The display module DM may include a display panel DP, and an input sensor IS disposed on the display panel DP. The display panel DP may include a display element layer. For example, the display element layer may include an organic electroluminescence element, quantum dot luminescence element, or liquid crystal element layer. The display element layer may generate and/or emit light for displaying an image IM. However, the embodiment of the invention is not limited thereto.

In the display device ED according to an embodiment, the input sensor IS may include a plurality of sensing electrodes for sensing an external input. The input sensor IS may be a capacitive sensor, but is not particularly limited thereto. When manufacturing (or providing) the display panel DP, the input sensor IS may be directly formed on the display panel DP through a continuous process. However, the embodiment of the invention is not limited thereto, and the input sensor IS may be manufactured as a separate panel from the display panel DP, and subsequently be attached to the display panel DP by a third member such as an adhesive layer (not shown).

In the display device ED according to an embodiment, the display module DM may include a folding display portion FA-D and a non-folding display portion provide in plural including a plurality of non-folding display portions NFA1-D and NFA2-D. The folding display portion FA-D may be a portion corresponding to the folding region FA1 (see FIG. 1A), and the non-folding display portions NFA1-D and NFA2-D may be portions corresponding to the non-folding regions NFA1 and NFA2 (see FIG. 1A).

The folding display portion FA-D may correspond to a portion foldable or bendable to be folded or bent with respect to the first folding axis FX1. The display module DM includes a first non-folding display portion NFA1-D and a second non-folding display portion NFA2-D, where the first non-folding display portion NFA1-D and the second non-folding display portion NFA2-D may be spaced apart from each other with the folding display portion FA-D interposed therebetween.

In the display device ED according to an embodiment, the lower module LM may include an upper support plate SP and a lower support plate MP. In addition, in an embodiment, the lower module LM may further include a support module SM, a protective layer PF, and a buffer layer CPN. For example, the display device ED according to an embodiment may include the upper support plate SP disposed on a lower side of the display module DM, the protective layer PF disposed between the upper support plate SP and the display module DM, the lower support plate MP disposed on a lower side of the upper support plate SP, the buffer layer CPN disposed between the upper support plate SP and the lower support plate MP, and the support module SM disposed on a lower side of the lower support plate MP.

In an embodiment, the upper support plate SP may be disposed on a lower side of the display module DM. The upper support plate SP may include a folding support portion FA-SP and non-folding portions NFA1-SP and NFA2-SP. In the present disclosure, the folding support portion FA-SP may be referred to as a folding portion, and the non-folding portions NFA1-SP and NFA2-SP may be referred to as non-folding portions or collectively as a support portion. A first non-folding support portion NFA1-SP and a second non-folding support portion NFA2-SP of the upper support plate SP may be spaced apart from each other with the folding support portion FA-SP interposed therebetween. The folding support portion FA-SP may be a portion corresponding to the folding region FA1 (see FIG. 1A), and the non-folding support portions NFA1-SP and NFA2-SP may be portions corresponding to the non-folding regions NFA1 and NFA2 (see FIG. 1A).

The upper support plate SP may include a support layer SL and a metal layer ML. The support plate SL may be disposed on a lower side of the display module DM. The support layer SL supports components disposed on an upper side of the support layer SL, and maintains a position of the display device ED in both an unfolded state and a folded state of the display device ED.

The metal layer ML may be directly disposed on a lower side of the support layer SL. For example, the metal layer ML may be a metal substrate of a film shape attached on a lower surface of the support layer SL. The metal layer ML may include a metal material. In a direction along the upper support plate SP, metal portions (e.g., protruding portions of the metal layer ML) may alternate with protruding portions of the support layer SL.

The metal layer ML may include a first metal layer ML1 and a second metal layer ML2 spaced apart from each other in the first direction DR1 direction. The first metal layer ML1 and the second metal layer ML2 may be spaced apart from each other on the basis of a portion corresponding to the first folding axis FX1. That is, the first metal layer ML1 and the second metal layer ML2 may be disconnected from each other at the folding region FA1. Since the metal layer ML is provided as the first metal layer ML1 and the second metal layer ML2 spaced apart from each other in the folding region FA1, the folding or bending properties of the display device ED may be improved.

In the upper support plate SP of an embodiment, a separate pressure-sensitive adhesive member or adhesive member may not be included between the support layer SL and the metal layer ML. The support layer SL and the metal layer ML may be bonded to each other by self-adhesion without a separate pressure-sensitive adhesive member or an adhesive member. The support layer SL and the metal layer ML which are adjacent to each other may be fixed to each other by self-adhesion caused by heat provided during a process of laminating and processing the support layer SL and the metal layer ML. Here, the support layer SL and the metal layer ML which are self adhered, may form an interface therebetween.

In an embodiment, the lower support plate MP may be disposed on a lower side of the upper support plate SP. On a plane, the lower support plate MP may include a first lower support plate MP1 and a second lower support plate MP2 respectively overlapping the first non-folding support plate NFA1-SP and the second non-folding support plate NFA2-SP. The lower support plate MP may absorb an external impact applied from the lower side thereof. The lower support plate MP may include a metal material such as stainless steel. The lower support plate MP may be disconnected at the folding region FA1, and include the first lower support plate MP1 and the second lower support plate MP2 coplanar with each other.

Referring to FIG. 3 and FIG. 4, the protective layer PF may be disposed between the display module DM and the upper support plate SP. The protective layer PF may be a layer disposed on a lower side of the display module DM to support the rear surface of the display module DM. The protective layer PF may overlap the entire display module DM, in a plan view. The protective layer PF may include a polymer material. For example, the protective layer PF may be a polyimide film or a polyethylene terephthalate film. However, this is only exemplary, and the material of the protective layer PF is not limited thereto.

The display device ED of an embodiment may include the buffer layer CPN in the lower module LM. The buffer layer CPN may be disposed on a lower side of the upper support plate SP, or unlike what it illustrated, may be disposed on an upper side of the upper support plate SP. The buffer layer CPN may increase resistance against compressive force caused by external pressing. Therefore, the buffer layer CPN may serve to prevent the deformation of the display module DM. The buffer layer CPN may include a flexible plastic material such as thermoplastic polyurethane (TPU), polyimide, or polyethylene terephthalate. Unlike what is illustrated, in an embodiment, the buffer layer CPN may be omitted.

The support module SM may include a support member SPM and a filler SAP as a step compensation member. The support member SPM may be a portion of the support module SM overlapping most regions of the display module DM, alone a plane. The filler SAP may be a portion disposed on the outer side of the support member SPM and overlapping the outer periphery of the display module DM.

The support module SM may include at least one of cushion layers CP1 and CP2, a shielding layer EMP and an interlayer bonding layer ILP. The configuration of the support module SM is not limited to what is illustrated in FIG. 4 and the like, and the configuration of the support module SM may be changed depending on the size, shape, operation properties or the like of the display device ED. For example, some of the cushion layers CP1 and CP2, the shielding layer EMP, and the interlayer bonding layer ILP may be omitted, or the lamination order thereof may be changed to an order different from that of FIG. 4, or additional components other than the illustrated components may be further included. For example, the support module SM may further include a digitizer and the like.

The shielding layer EMP may be an electromagnetic wave shielding layer and/or a heat dissipating layer. In addition, the shielding layer EMP may serve as a bonding layer. The filler SAP may be disposed at the outer periphery of the cushion layers CP1 and CP2. The filler SAP may be disposed between the lower support plate MP and the housing HAU. The filler SAP may fill a space between the lower support plate MP and the housing HAU, and may fix a position of the lower support plate MP within the display device ED.

In the display device ED of an embodiment, the combination of the components included in the lower module LM may vary depending on the size, shape, operation properties, or the like of the display device ED.

In addition, the display device ED of an embodiment may further include at least one of adhesive layers AP1 and AP2. For example, a first adhesive layer AP1 may be disposed between the display module DM and the protective layer PF, and a second adhesive layer AP2 may be disposed between the protective layer PF and the upper support plate SP. At least one of the adhesive layers AP1 and AP2 may be a pressure sensitive adhesive (PSA) layer, an optically clear adhesive (OCA) film, or an optically clear adhesive resin (OCR) layer. However, the embodiment of the invention is not limited thereto, and at least one of the adhesive layer AP1 and AP2 may be an adhesive layer having permeability may be an adhesive layer with a low permeability of approximately 80% or less. Although not illustrated, a display device ED of an embodiment may further include an adhesive layer disposed between the buffer layer CPN and the upper support plate SP, and/or between the buffer layer CPN and the lower support plate MP.

In FIG. 3 and the like, it is illustrated that the first folding axis FX1 is parallel to a long side of the display device ED, but the embodiment of the invention is not limited thereto. In a display device ED according to an embodiment, a folding axis may be parallel to a short side of the display device ED.

Figure 5:
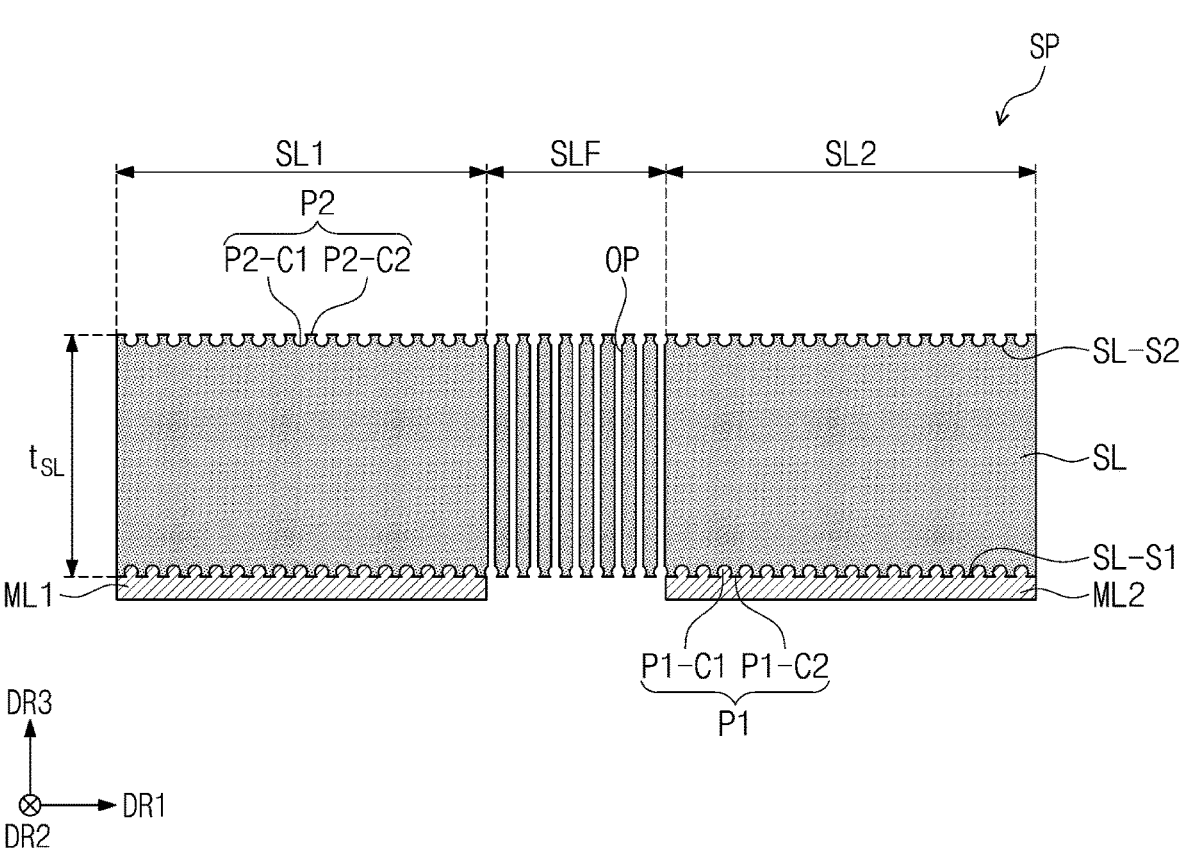
FIG. 5 is a cross-sectional view of a lower module according to an embodiment of the invention.

FIG. 5 is a cross-sectional view showing an upper support plate according to an embodiment. Referring to FIG. 5, the upper support plate SP of an embodiment includes the support layer SL and the metal layer ML, and the metal layer ML may be directly disposed on a lower surface of the support layer SL.

In the upper support plate SP of an embodiment, the support layer SL may include a non-metal material. The support layer SL as a nonmetallic layer may include a reinforced fiber composite material. The support layer SL may include a reinforced fiber disposed on the inner side of a matrix portion. The reinforced fiber may be glass fiber. The matrix portion may include a polymer material. For example, the matrix portion may include at least one polymer material among epoxy, polyester, polyamide, polycarbonate, polypropylene, polybutylene, and vinyl ester. For example, the reinforced fiber composite material may be glass fiber reinforced plastics (GFRP). Since the support layer SL of an embodiment includes glass fiber reinforced plastics, carbon foreign matters are not generated unlike carbon fiber reinforced plastics (CFRP) even when a PCB production line is used during manufacturing, so that costs of manufacturing or providing the display device ED may be reduced since a typical production line may be used.

In an embodiment, the support layer SL may include a first surface SL-S1 defined by the first direction DR1 and the second direction DR2 which crosses the first direction DR1, and a second surface SL-S2 facing the first surface SL-S1. In the support layer SL, the first surface SL-S1 and the second surface SL-S2 may oppose each other in the third direction DR3, and the normal direction of each of the first surface SL-S1 and the second surface SL-S2 may be parallel to the third direction DR3. For example, in the support layer SL, the first surface SL-S1 may be spaced apart from the display module DM, and the second surface SL-S2 may be adjacent to the display module DM (e.g., closer to the display module DM than the first surface SL-S1).

Referring to FIG. 5, the first surface SL-S1 and the second surface SL-S2 of the support layer SL may respectively include concave-convex patterns P1 and P2. In the support layer SL according to an embodiment, the first surface SL-S1 may include a first concave-convex pattern P1, and the second surface SL-S2 may include a second concave-convex pattern P2. Each of the first concave-convex pattern P1 and the second concave-convex pattern P2 may include concave portions P1-C1 and P2-C1, and convex portions P1-C2 and P2-C2, respectively. The first surface SL-S1 may include a first concave portion P1-C1 and a first convex portion P1-C2 adjacent to each other, and the second surface SL-S2 may include a second concave portion P2-C1 and a second convex portion P2-C2 adjacent to each other. The first concave portion P1-C1 and the first convex portion P1-C2 may be alternately arranged along the support layer SL to define the first surface SL-S1 thereof, and the second concave portion P2-C1 and the second convex portion P2-C2 may be alternately arranged along the support layer SL to define the second surface SL-S2 thereof. Within the support layer SL and/or a respective surface, sizes and shapes of the first concave-convex pattern P1 and the second concave-convex pattern P2 may be the same or different from each other.

In an embodiment, the support layer SL includes a first support portion SL1 corresponding to the first non-folding support portion NFA1-SP and a second support portion SL2 corresponding to the second non-folding support portion NFA2-SP. The first support portion SL1 and the second support portion SL2 are spaced apart from each other in the first direction DR1. The support layer SL corresponds to the folding support portion FA-SP (see FIG. 3), and may include a folding portion SLF disposed between the first support portion SL1 and the second support portion SL2. The folding portion SLF may be a portion of the support layer SL corresponding to the folding region FA1 (see FIG. 1A) and at which the support layer SL is foldable together with the display device ED, and the first and second support portions SL1 and SL2 may be portions corresponding to the non-folding regions NFA1 and NFA2 (see FIG. 1A). The first support portion SL1, the second support portion SL2, and the folding portion SLF may have a shape of a single body. As a single body, solid portions of the support layer SL may be connected to each other along the plane of the support layer SL. On a lower side of the first support portion SL1, the second support portion SL2 and the folding portion SLF which is furthest from the display module DM, the first concave-convex pattern P1 may be provided, and on an upper side thereof which is closest to the display module DM, the second concave-convex pattern P2 may be provided.

In the folding portion SLF of the support layer SL, a plurality of openings OP may be defined. The plurality of openings OP may be arranged such that the folding support portion FA-SP (see FIG. 3) may have a lattice pattern on a plane.

In an embodiment, a thickness $t_{SL}$ of the support layer SL may be about 100 micrometers (μm) to about 300 μm. The thickness $t_{SL}$ of the support layer SL may be a thickness in the third direction DR3, and may represent a maximum thickness of the support layer SL between distal ends of the various protruding portions (e.g., concave-convex patterns), without being limited thereto. The thickness $t_{SL}$ of the support layer SL at the folding portion SLF of the support layer SL, and the thickness $t_{SL}$ of the support layer SL at the first and second support portions SL1 and SL2 thereof, may be substantially the same. As the thickness $t_{SL}$ of the support layer SL at the folding portion SLF and the thickness $t_{SL}$ of the support layer SL at the first and second support portions SL1 and SL2, are substantially the same, a visibility problem of a step due to a difference in thickness within the folding portion may be prevented.

The Young's Modulus of the support layer SL may be approximately 10 gigapascals (GPa) to approximately 40 GPa. The support layer SL having a Young's Modulus of approximately 10 GPa to approximately 40 GPa may exhibit excellent mechanical properties with improved durability.

In an embodiment, the support layer SL may include a plurality of prepreg layers which include the glass fiber and the polymer material described above. That is, the support layer SL may include a plurality of prepreg layers using a glass fiber composite material such as glass fiber reinforced plastics. For example, the support layer SL may be a laminate in which 2 to 5 prepreg layers are stacked and/or laminated. The support layer SL in which 2 to 5 prepreg layers are laminated may support components disposed on an upper layer of the support layer SL, and may have suitable strength to maintain a shape of the display device ED in both the unfolded and folded states of the display device ED.

In an embodiment, the metal layer ML is disposed on a lower side of the support layer SL. The metal layer ML may serve as a heat dissipation layer and/or an electromagnetic wave shielding layer. The metal layer ML may include a metal material such as copper (Cu).

The metal layer ML may be directly disposed on a lower side of the support layer SL while filling the first concave portion P1-C1 of the first concave-convex pattern P1. The metal layer ML may have a concave-convex portion (e.g., a metallic concave-convex portion) in contact with the first concave-convex pattern P1 on at least one surface thereof. The concave-convex portion of the metal layer ML includes or defines a concave portion and a convex portion, and may have a size and a shape which may overlap the first concave-convex pattern P1. The concave-convex portion of the metal layer ML may have substantially the same pattern aspect as that of the first concave-convex pattern P1, such as having complimenting surface profiles. Accordingly, in the concave-convex portion of the metal layer ML, the convex portion of the metal layer ML may be engaged with the concave portions P1-C1 of the first concave-convex pattern P1, and the concave portion of the metal layer ML may be engaged with the convex portion P1-C2 of the first concave-convex pattern P1. That is, the metal layer ML may fill the concave portion P1-C1 of the first concave-convex pattern P1 without an empty space (e.g., completely fill).

In the metal layer ML, a surface of the metal layer ML which is in contact with the first concave-convex pattern P1 of the support layer SL may have or define a surface roughness Rz of approximately 0.1 micrometer (μm) or greater. When the surface roughness Rz of the metal layer ML is approximately 0.1 μm or greater, excellent surface pressure-sensitive adhesion to the support layer SL may be exhibited due to an anchor effect. In an embodiment, a concave-convex portion may be provided at a contacting surface of the metal layer ML, which has a surface roughness Rz of approximately 0.1 μm or greater.

The metal layer ML may include a first metal layer ML1 and a second metal layer ML2 which respectively overlap the first support portion SL1 and the second support portion SL2. For example, the first metal layer ML1 may be directly disposed on a lower side of the first support portion SL1 and fill the concave portion P1-C1 of the first concave-convex pattern P1, and the second metal layer ML2 may be directly disposed on a lower side of the second support portion SL2 and fill the concave portion P1-C1 of the first concave-convex pattern P1. The metal layer ML is directly attached to the support layer SL by heat such as to form a direct bond, without a separate pressure-sensitive adhesive member or an adhesive member, during laminating and processing the support layer SL and the metal layer ML. Therefore, the display device ED of an embodiment includes the upper support plate SP having both metallic and nonmetallic portions both along the plane (e.g., the first direction DR1 and the second direction DR3) and along the thickness (e.g., along the third direction DR3), with reduced thickness, and thus, may have improved folding properties.

FIG. 6A to FIG. 6D are each a view exemplarily showing structures and processes in a method of providing a lower module LM according to an embodiment of the invention. In a method for manufacturing (or providing) a lower module LM described with reference to FIG. 6A to FIG. 6D, the components described above with reference to FIG. 1 to FIG. 5 will be given the same reference numerals and descriptions given above will be omitted.

Figure 6A:
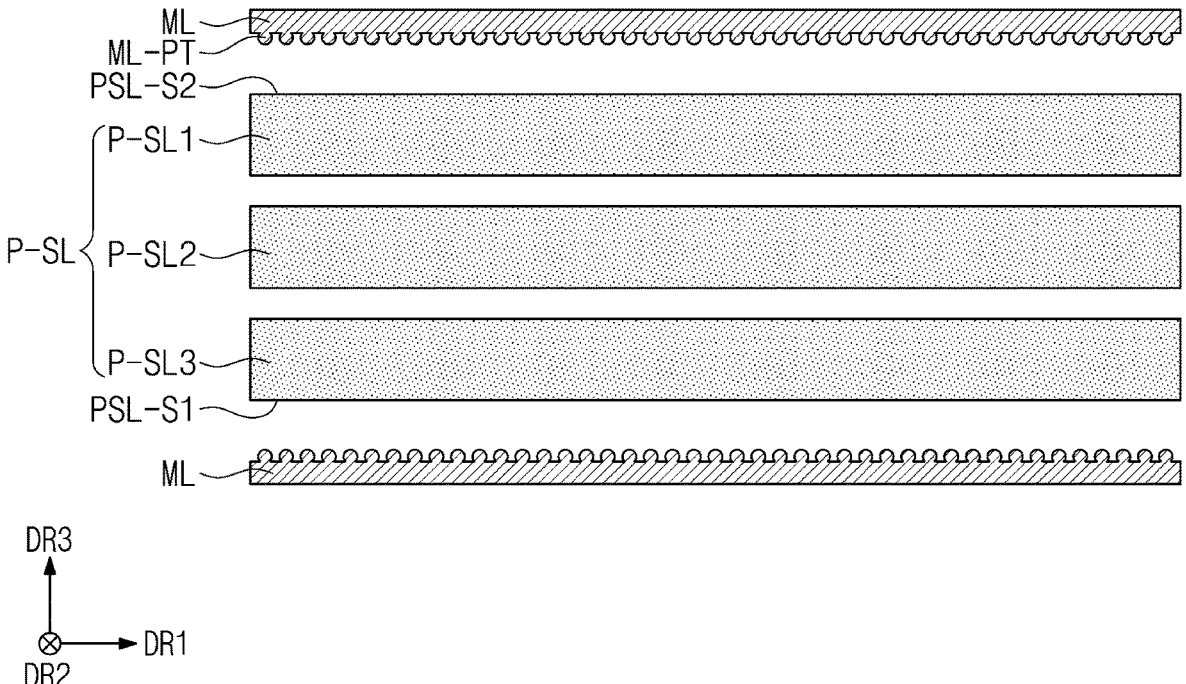
FIG. 6A is a view showing some of steps of manufacturing a lower module according to an embodiment of the invention.

Referring to FIG. 6A, in a step of providing a preliminary support layer P-SL, the preliminary support layer P-SL may be provided by laminating a plurality of preliminary sub-support layers P-SL1, P-SL2, and P-SL3 in the third direction DR3. FIG. 6A illustrates the preliminary support layer P-SL provided by laminating three preliminary sub-support layers P-SL1, P-SL2, and P-SL3 as a stack of sub-support layers, in the third direction DR3, but the embodiment of the invention is not limited thereto. The preliminary support layer P-SL may be provided by laminating 2 to 5 preliminary sub-support layers.

The preliminary support layer P-SL may include glass fiber and a polymer material. Each of the preliminary sub-support layers P-SL1, P-SL2, and P-SL3 may be a prepreg layer including glass fiber as a fibrous material and a polymer material as a material which is impregnated, coated, injected, etc. relative to the glass fiber. The same contents as those described above with reference to the support layer SL of the display device ED may be applied to the glass fiber and the polymer material which are included in the preliminary support layer P-SL. A method for manufacturing (or providing) the prepreg layer is not particularly limited, and the prepreg layer may be prepared by a method known in the art. For example, the prepreg layer may be manufactured by impregnation, coating using various coaters, spray injection, and the like. In an embodiment, the prepreg layer may be a polymer material-impregnated glass fiber layer.

Referring to FIG. 6A, the metal layer ML (otherwise referred to as a preliminary metal layer ML) having a concave-convex portion ML-PT may be provided on an upper side and a lower side of the preliminary support layer P-SL. For example, the metal layer ML may be provided to each of a first surface PSL-S1 and a second surface PSL-S2 of the preliminary support layer P-SL which face each other. The metal layer ML may be provided such that the concave-convex portion ML-PT comes into contact with the first surface PSL-S1 and the second surface PSL-S2.

Figure 6B:
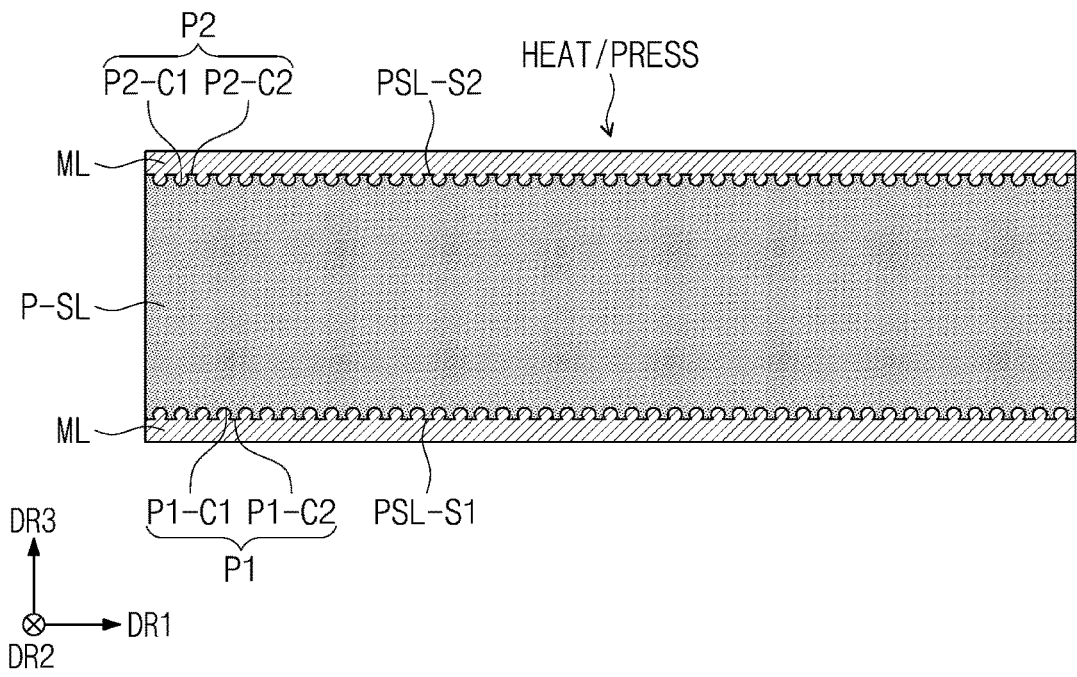
FIG. 6B is a view showing some of steps of manufacturing a lower module according to an embodiment of the invention.

Referring to FIG. 6A and FIG. 6B, the preliminary support layer P-SL and the metal layer ML, which are laminated in the order of the metal layer ML-preliminary support layer P-SL-metal layer ML along the third direction DR3, may be heated and pressurized to form a concave-convex pattern at the first surface PSL-S1 and the second surface PSL-S2 of the preliminary support layer P-SL. The metal layer ML may be integrated with the preliminary support layer P-SL by heating and pressurizing. That is, the metal layer ML may be attached to the preliminary support layer P-SL by heating and pressurizing without a separate pressure-sensitive adhesive member or an adhesive member, such as to provide a direct bond between the metal layer ML and the preliminary support layer P-SL. Therefore, when one or more embodiment of a method for manufacturing a lower module LM of an embodiment is used, a process in which a pressure-sensitive adhesive member or an adhesive member attaches a metal layer ML to a support layer SL may be omitted, so that manufacturing costs may be reduced and the thickness of a lower module LM may be decreased.

In an embodiment, when the sequentially laminated metal layer ML-preliminary support layer P-SL-metal layer ML are heated and pressurized, a pattern of the concave-convex portion ML-PT provided at a patterned surface of the metal layer ML may be transitioned or transferred to the first surface PSL-S1 and the second surface PSL-S2 of the preliminary support layer P-SL. As a result, the concave-convex patterns P1 and P2 may define the first surface PSL-S1 and the second surface PSL-S2 of the preliminary support layer P-SL.

Further, when the sequentially laminated metal layer ML-preliminary support layer P-SL-metal layer ML are heated and pressurized, the three preliminary sub-support layers P-SL1, P-SL2, and P-SL3 may be laminated and bonded to each other, without being limited thereto. In an embodiment, the three preliminary sub-support layers P-SL1, P-SL2, and P-SL3 may be pre-bonded to each other, before heating and pressing the stacked structure of the metal layer ML-preliminary support layer P-SL-metal layer ML, to provide patterned surfaces of the preliminary support layer P-SL.

The first concave-convex pattern P1 formed on the first surface PSL-S1 may include the first concave portion P1-C1 and the first convex portion P1-C2, and the second concave-convex pattern P2 formed on the second surface PSL-S2 may include the second concave portion P2-C1 and the second convex portion P2-C2. Since the pattern of the concave-convex portion ML-PT of the metal layer ML is transitioned to the preliminary support layer P-SL by heating and pressurizing, the first and second concave-convex patterns P1 and P2 formed on the preliminary support layer P-SL may exhibit substantially the same pattern aspect as the concave-convex portion ML-PT of the metal layer ML. Since the pattern of the concave-convex portion ML-PT of the metal layer ML and the first and second concave-convex patterns P1 and P2 show substantially the same pattern aspect, the first and second concave-convex patterns P1 and P2 may be formed in the shape of being engaged with the pattern of the concave-convex portion ML-PT without an empty space.

Figure 6C:
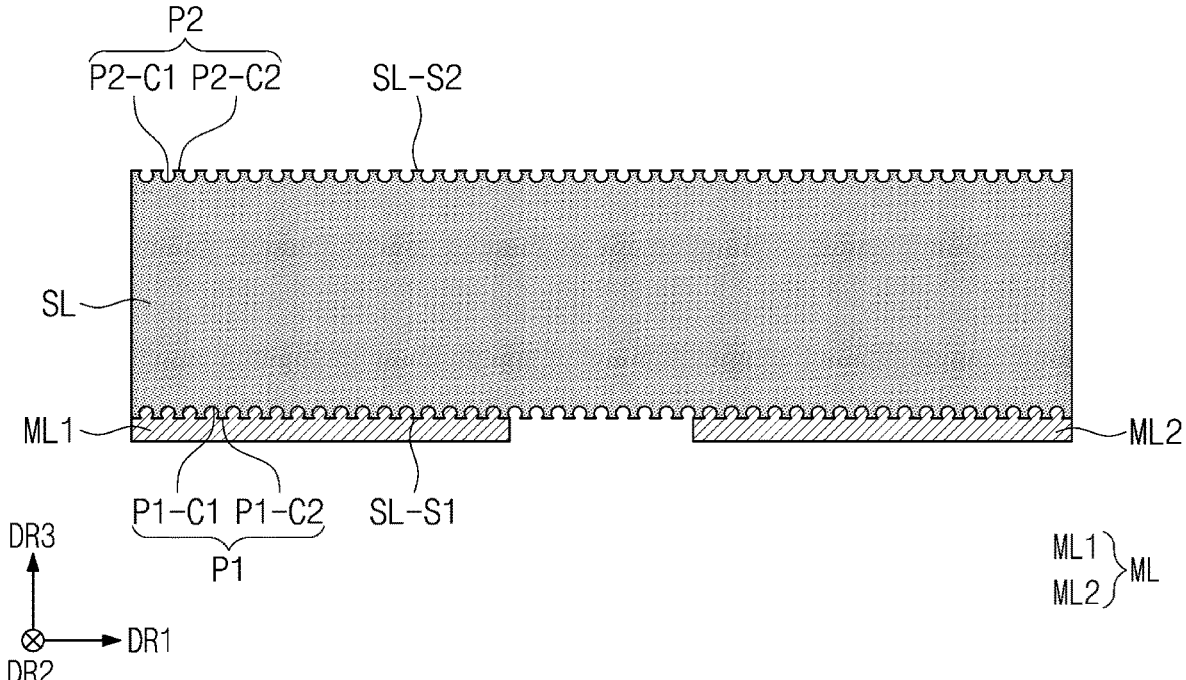
FIG. 6C is a view showing some of steps of manufacturing a lower module according to an embodiment of the invention.

Referring to FIG. 6C, a portion of the metal layer ML may be removed from the support layer SL with the concave-convex patterns P1 and P2. The metal layer ML may be removed from any one of the first surface SL-S1 and the second surface SL-S2 of the support layer SL. In an embodiment, the metal layer ML may be entirely removed from the second surface SL-S2 of the support layer SL. In addition, a portion of the metal layer ML may be removed from the first surface SL-S1 of the support layer SL. For example, a portion of the metal layer ML attached to the first surface SL-S1 may be removed such that the metal layer ML is absent from the first surface SL-S1 of the support layer SL along the first direction DR1 and is disposed divided into the first metal layer ML1 and the second metal layer ML2. The second surface SL-S2 of the support layer SL from which the metal layer ML is entirely removed may be a surface disposed closest to the display module DM illustrated in FIG. 4. The first surface SL-S1 of the support layer SL from which a portion of the metal layer ML is removed may be a surface disposed furthest from the display module DM illustrated in FIG. 4. The metal layer ML which remains without being removed from the first surface SL-S1 may be divided into the first metal layer ML1 and the second metal layer ML2 spaced apart in the first direction DR1. A method for removing the metal layer ML from the support layer SL is not particularly limited, and the metal layer ML may be removed by a method known in the art. For example, the metal layer ML may be removed from the support layer SL by a dry etching or wet etching process.

Figure 6D:
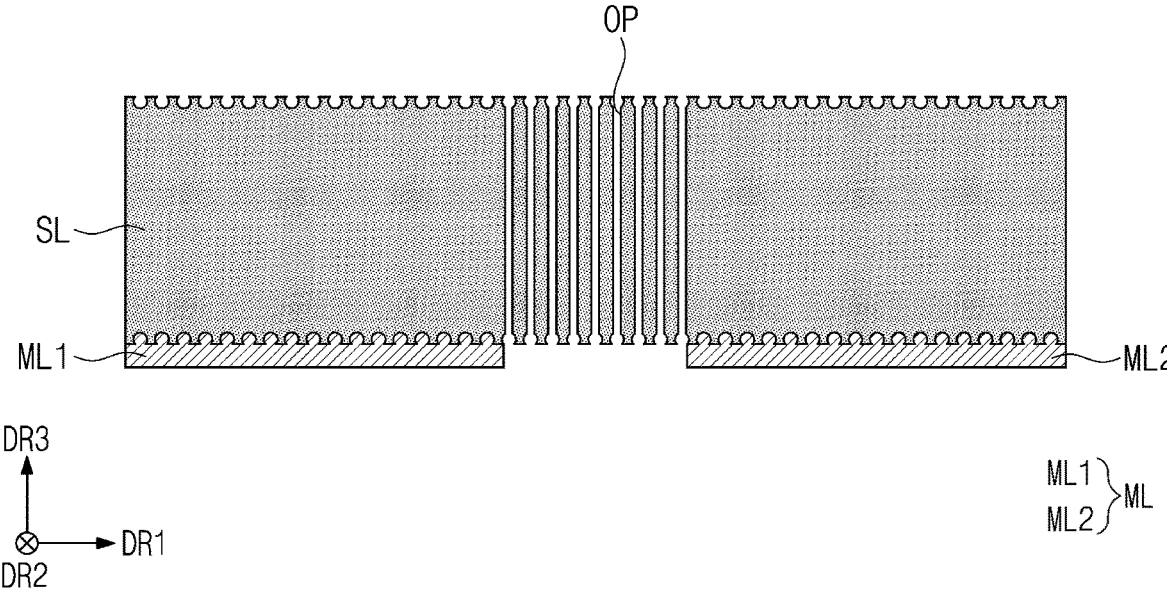
FIG. 6D is a view showing some of steps of manufacturing a lower module according to an embodiment of the invention.

Referring to FIG. 6D, the method for manufacturing a lower module LM of an embodiment may remove the metal layer ML from the support layer SL, and then form a plurality of openings OP on the support layer SL. In the support layer SL, a portion in which the plurality of openings OP are formed may correspond to the folding portion SLF (see FIG. 5) of the support layer SL illustrated in FIG. 5. The plurality of openings OP may be formed such that the folding portion SLF (see FIG. 5) has a lattice pattern within the folding portion SLF on a plane.

The configuration of the lower support module SP according to an embodiment described with reference to FIG. 3 to FIG. 5 may be equally applied to a display device ED-a according to an embodiment illustrated in FIG. 2A, FIG. 2B, and the like.

A display device ED of an embodiment includes an upper support plate SP on a lower side of a display module DM, where the upper support plate SP includes a support layer SL including glass fiber and a polymer material, and including a concave-convex pattern, and a metal layer ML directly disposed on a lower surface of the support layer SL having the concave-convex patterned surface, so that the display device ED may exhibit excellent durability. In addition, the upper support plate SP included in the display device ED of an embodiment is manufactured (or provided) through a process of attaching a metal layer ML to a support layer SL without a separate pressure-sensitive adhesive member or an adhesive member, such as providing a direct bond between the metal layer ML and the support layer SL, so that manufacturing costs are reduced, and an overall thickness of a lower module LM may be decreased.

A display device ED of an embodiment includes, in a lower portion of a display module DM, a support layer SL including glass fiber and a polymer material (e.g., a non-metallic layer), and defining a concave-convex pattern, and a metal layer ML which is attached to the support layer SL, so that the display device ED may exhibit excellent mechanical properties and good folding properties.

A method for manufacturing (or providing) a lower module LM of an embodiment allows a metal layer ML to be attached to a support layer SL without a separate pressure-sensitive adhesive member or adhesive member (e.g., directly-bonded to each other), so that manufacturing cost may be reduced, and the thickness of a lower module LM may be reduced.

Although the invention has been described with reference to embodiments of the present invention, it will be understood by those skilled in the art that various modifications and changes in form and details may be made therein without departing from the spirit and scope of the invention as set forth in the following claims.

Accordingly, the technical scope of the present invention is not intended to be limited to the contents set forth in the detailed description of the specification, but is intended to be defined by the appended claims.

What is claimed is:

1. An electronic device including:
   a display device comprising:
   a folding region, and a non-folding region which is adjacent to the folding region along a first direction;
   a display module which displays an image;
   a window on the display module;
   a lower support plate facing the window with the display module therebetween, the lower support plate including a metal material; and
   an upper support plate between the display module and the lower support plate,
   wherein the upper support plate includes:

a support layer including glass fiber and a polymer material, the support layer including:
      a first surface including a first concave-convex pattern, and
      a second surface opposite to the first surface, closer to the display module than the first surface and including a second concave-convex pattern;
   a metal layer directly on the first surface of the support layer, in the non-folding region; and
   the glass fiber and the polymer material of the support layer in a same plane as a portion of the metal layer.

2. The electronic device of claim 1, wherein the support layer of the upper support plate comprises:
   a folding portion corresponding to the folding region, the folding portion defining a plurality of openings of the upper support plate; and
   a support portion corresponding to the non-folding region.

3. The electronic device of claim 2, wherein within the upper support plate,
   the first concave-convex pattern corresponds to each of the folding portion and the support portion, and
   the second concave-convex pattern corresponds to each of the folding portion and the support portion.

4. The electronic device of claim 3, wherein within the upper support plate:
   each of the first concave-convex pattern and the second concave-convex pattern comprises a concave portion and a convex portion; and
   the glass fiber and the polymer material of the support layer is between the first surface and the second surface, overlapping each of the concave portions and each of the convex portions.

5. The electronic device of claim 1, wherein the metal layer has a surface in contact with the first concave-convex pattern of the support layer, the surface having a surface roughness of approximately 0.1 micrometers or greater.

6. The electronic device of claim 1, wherein within the support layer of the upper support plate, the polymer material comprises at least one of epoxy, polyester, polyamide, polycarbonate, polypropylene, polybutylene and vinyl ester.

7. The electronic device of claim 1, wherein within the upper support plate, a Young's modulus of the support layer is approximately 10 gigapascals to approximately 40 gigapascals.

8. The electronic device of claim 1, wherein within the upper support plate, a thickness of the support layer is approximately 100 micrometers to approximately 300 micrometers.

9. The electronic device of claim 1, wherein within the upper support plate, the metal layer comprises copper.

10. The electronic device of claim 1, wherein
   the lower support plate and the upper support plate define portions of a lower module which faces the window with the display module therebetween, and
   the lower module further comprises at least one of a protective layer, a buffer layer and a support module.

11. The electronic device of claim 1, wherein within the upper support plate, the support layer comprises a plurality of polymer material-impregnated glass fiber layers.

12. The electronic device of claim 11, wherein within the upper support plate, the support layer comprises 2 to 5 the polymer material-impregnated glass fiber layers which are laminated.

* * * * *